Patented Apr. 17, 1951

2,549,520

UNITED STATES PATENT OFFICE 2,549,520

PREPARATION OF SUBSTITUTED CYCLIC KETONES

William Prichard, Wilmington, Del., assignor to E. I. du Pont de Nemours & Company, Wilmington, Del., a corporation of Delaware No Drawing. Application December 29, 1947, Serial No. 794,451

7 Claims. (Cl. 260—586)

This invention relates to methods for preparing organic compounds and more particularly it relates to the catalytic synthesis of alkyl-substituted and hydroxy-alkyl-substituted cyclic ketones.

Alkyl-substituted cyclic ketones are of interest for oxidation to alkyl-substituted $\alpha,\omega$-dicarboxylic acids, which are intermediates for polyamides, polyesters, polyester-amides, etc. Hydroxy-alkyl-substituted cyclic ketones are of similar interest, since they may be converted by reduction to the corresponding alkyl-substituted compounds. A general method for preparing the alkyl-substituted cyclic ketones is by reaction of the alkali metal adduct of the cyclic ketone with an alkyl halide. This route involves the consumption of at least one gram atom of sodium per mol of alkyl-substituted cyclic ketone produced, and hence is not very practical from the standpoint of economics. Another general method for producing alkyl-substituted cyclic ketones is by condensation of the cyclic ketone with an aldehyde in an alkaline medium followed by reduction of the adduct. This procedure is also not practical because of interfering side reactions, such as the self-condensation of the aldehyde, which decrease the yield of desired product and introduce purification difficulties. A method for synthesizing the specific alkyl-substituted cyclic ketone, 1-methylcyclohexanone-3, involves heating pulegone with water under pressure, under which conditions hydrolytic decomposition occurs at the semi-cyclic double bond. Because of the cost and relative unavailability of pulegone, however, the process does not represent a practical synthesis even for this specific compound.

It is an object of this invention to provide novel processes for preparing certain organic compounds. Another object of the invention is to provide novel processes for the catalytic synthesis of alkyl-substituted and hydroxy-alkyl-substituted cyclic ketones. A further object is to provide novel processes for preparing compounds suitable for oxidation to alkyl-substituted $\alpha,\omega$-dicarboxylic acids, which, in turn, are intermediates for polyamides, polyesters, polyester-amides, etc. A still further object is to provide novel one-step processes for preparing these compounds from readily available raw materials. Another object of the invention is to provide novel processes for preparing the compound, 2-ethylcyclohexanone. Other objects of the invention will appear hereinafter.

According to this invention, it has been found that compounds of the class consisting of the alkyl-substituted cyclic ketones and the hydroxy-alkyl-substituted cyclic ketones can be successfully prepared by a one-step reaction between an alcohol compound containing a primary alcohol group and a cyclic ketone containing a

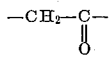

group as a part of the cyclic structure. The reaction is carried out by contacting a mixture of the alcohol and the ketone with a hydrogenation catalyst at a temperature in excess of 200° C. The various preferred embodiments of the invention will be brought out by the discussion and examples which follow.

The process of this invention can be carried out either as a batch or as a semi-continuous or as a continuous process.

According to a general procedure for batchwise operation, a stainless steel reactor is swept with deoxygenated nitrogen, charged with the ketone, at least one mol of the primary alcohol per mol of ketone, and at least 1% by weight of a hydrogenation catalyst. The reactor is closed, placed on a rocker mechanism and heating and agitation are started. The temperature of the reaction mixture is adjusted to the desired temperature and maintained in this range for a period of time in excess of one-half hour. At the end of the reaction, the reactor is allowed to cool, the contents discharged and filtered to remove catalyst, and the filtrate subjected to fractional distillation to recover the desired alkylated ketone.

In continuous operation, a mixture of the ketone and alcohol is continuously contacted with a hydrogenation catalyst, which is maintained at the desired temperature, preferably between 200° and 350° C. The reaction products are withdrawn, and the unreacted components recycled through the reactor, if desired.

Any alcohol compound containing a primary alcohol group may be used in the practice of this invention. When monohydroxy primary alcohols are employed, the products obtained are the alkyl-substituted cyclic ketones, whereas when polyhydroxy alcohols containing a primary alcohol group are employed, the products obtained are hydroxy-alkyl-substituted cyclic ketones. Examples of alcohols suitable for use in the process of this invention are methanol, ethanol, propanol-1, butanol-1, isobutanol, octanol-1, dodecanol-1, 2-methyl-3-ethylpentanol-1, 2-ethylhexanol-1, 3,5,5-trimethylhexanol-1, ethylene glycol, propylene glycol, pentamethylene, glycol, hexamethylene glycol, octadecanediol-1,12, benzyl alcohol, phenylethyl alcohol, tetrahydrofurfuryl alcohol, allyl alcohol, methallyl alcohol, crotyl alcohol, etc. The monohydroxy primary alcohols, and ethanol in particular, are preferred.

The cyclic ketones used in the process of this invention are those containing at least one methylene group which is in the alpha position relative to the keto-carbonyl group and which forms part of the cyclic structure. Examples are cyclopentanone, 2-methylcyclopentanone, cyclohexanone, 2-methylcyclohexanone, 3-methylcyclohexanone, decalone, tetralone, etc. The preferred ketone is cyclohexanone because the products obtained therefrom can be oxidized to give particularly useful derivatives of adipic acid.

The temperature conditions utilized are those which permit the reaction to proceed at a practical rate without inducing undue by-product formation. The process is carried out at temperatures in excess of 200° C. because at lower temperatures the reaction is too slow for practical purposes. As the temperature is increased above 200° C., reaction velocity increases, but this is accompanied by complicating side reactions, which decrease the yield of the desired product. At 350° C. the amount of by-product formation almost equals that of the desired product, and, for this reason, operation at temperatures in excess of 350° C. may become impractical. Best yields of the desired substituted cyclic ketones are obtained in the range 240° C. to 270° C. and this therefore constitutes the preferred operating temperature range.

Although the invention is exemplified herein with particular reference to reduced cobalt, nickel, and zinc oxide-copper oxide hydrogenation catalysts, it is to be understood that in place thereof there can be used any of the hydrogenating metals of group 8, and sub-groups B of groups 1 and 2 of the periodic table, or their oxides, hydroxides, or salts. These catalysts may be used either alone or in admixture. Examples of suitable metals are iron, nickel, cobalt, platinum, ruthenium, copper, zinc, cadmium, and the like. These catalytic materials are preferably used in a finely divided form and may be deposited on porous supports such as pumice, kieselguhr, silica, alumina, and the like. Catalyst powders are conveniently prepared for use in the process of this invention by compressing them into pellets or briquettes of suitable size.

The preferred catalyst is reduced cobalt and it may be prepared in an active form by a number of methods. Among these are the reduction with hydrogen of oxygen-containing cobalt compounds, for example, the carbonate, the hydroxides, the oxides, the salts with inorganic acids such as chromic, vanadic, tungstic, and the like. Suitable temperatures for the reduction of such compounds are within the range of 250° to 500° C. An alternative method for the preparation of finely divided cobalt catalysts in active form is by digesting with alkali an alloy of cobalt with an alkali-soluble metal as described in U. S. Patents 1,628,190 and 1,915,473. These methods for preparing cobalt catalysts are also applicable, in general, to the preparation of the other catalysts useful in this invention.

By "hydrogenation catalyst" as used herein is meant a material which is capable of causing the union of hydrogen with a compound capable of hydrogenation with or without hydrogenolysis.

The proportions of alcohol and cyclic ketone employed are not critical. Thus, either the alcohol or ketone may be present in excess, in which event the reactant present in excess functions also as a solvent, and after the reaction may be recovered and recycled. As a rule, the less costly of the reactants is used in the larger amount. For example, if the ketone is to be alkylated with a relatively costly alcohol, it is more practical and desirable to have the ketone present in excess and in this way insure maximum utilization in the reaction of the alcohol. On the other hand, if the ketone is the more costly of the reactants, then the alcohol is used in excess for the reasons set forth above. When the alcohol and ketone are approximately equal in cost, then mol per mol proportions are desirably used. Amounts outside these values can be employed, however, if desired.

The particular pressure conditions employed depend upon the method of operation selected. Thus, in a batch process, autogenous pressures are generally used whereas in continuous operation, atmospheric pressure conditions are employed. If desired, however, pressures in excess of atmospheric may be used. The reaction may be carried out in the presence of various inert solvents.

The following examples illustrate certain definite conditions of temperature, times of reaction, catalyst concentrations, etc. It is to be understood, however, that these values may be varied considerably and that the examples are not to be construed as limitations of the invention. Unless otherwise stated, parts are by weight.

*Example 1.*—A stainless steel reactor is charged with 100 parts of cyclohexanone, 100 parts of absolute ethanol, and 10 parts of a reduced, finely divided cobalt catalyst. After heating and agitating at 250° C. for eight hours, the reactor is permitted to cool, discharged, and the contents filtered. The product amounts to 164 parts and this is distilled. The fraction boiling between 76° and 97° C. at 30 mm. pressure is refractionated, yielding 12 parts of 2-ethylcyclohexanone distilling at 89° to 91° C. at 25 mm., or 186° at one atmosphere. The normal boiling point of 2-ethylcyclohexanone is 183° to 184° C. The ketone is further characterized by preparation of the following derivatives.

(1) 2,4-dinitrophenylhydrazone, M.P. 164–166° C. Analysis calculated for $C_{14}H_{18}O_4N_4$; C, 54.9; H, 5.89; N, 18.30. Found: C, 55.03, 54.90; H, 6.05, 6.14; N, 18.28, 18.30.
(2) Semicarbazone—M.P. 158–159° C. The melting point reported for the semicarbazone of 2-ethylcyclohexanone is 157° C.

Reduction of the fraction boiling at 76° to 97° C. at 30 mm. pressure followed by fractional distillation yields two main fractions identified as cyclohexanol and a mixture of the cis and trans isomers of 2-ethylcyclohexanol, respectively. The 2-ethylcyclohexanol fraction corresponds to a 15% conversion to alkylated products.

Duplication of the above experiment in the absence of the cobalt catalyst produced no alkylated ketone.

*Example 2.*—A stainless steel reactor is charged with 37 parts of cyclohexanone, 37 parts of benzyl alcohol, and 5 parts of a reduced cobalt catalyst, and the charge heated and agitated at 275° C. for eight hours. The product recovered amounts to 64.3 parts. The liquid fraction of the crude product is washed with water and an orange oil amounting to 36 parts is recovered. After removal of a small foreshot of cyclohexanone and benzyl alcohol, there is recovered 6 parts of 2-benzylcyclohexanone boiling at 156° to 160° C. at 8 mm. pressure.

*Example 3.*—A stainless steel reactor is charged with 50 parts of n-butanol, 50 parts of cyclohexanone, and 5 parts of reduced cobalt catalyst, and the mixture is heated and agitated at 250° C. for eight hours. The product, which amounts to 95 parts, is distilled. After removal of unchanged starting materials, there is obtained 20 parts of 2-n-butylcyclohexanone boiling at 90° to 100° C. at 10 mm. pressure.

*Example 4.*—A stainless steel reactor is charged with 100 parts of cyclohexanone, 100 parts of ethylene glycol, and 5 parts of reduced cobalt catalyst, and the mixture is heated and agitated at 250° C. for eight hours. From the product, which amounts to 189 parts, there is recovered 2-hydroxyethylcyclohexanone.

*Example 5.*—A stainless steel reactor is charged with 100 parts of cyclohexanone, 100 parts of tetrahydrofurfuryl alcohol, and 10 parts of reduced cobalt catalyst, and the mixture is heated and agitated at 250° C. for eight hours. The reaction product is distilled and 10 parts of 2-tetrahydrofurfurylcyclohexanone boiling at 122° to 126° C. at 5 mm. pressure is obtained.

*Example 6.*—A vertical tubular reactor of 1.5″ I. D. is packed with 3.5″ (100 cc.) of a reduced pelleted cobalt catalyst. The reactor is heated to 300° C. and an equimolar mixture of cyclohexanone and ethanol is passed over the catalyst at the rate of 40 cc. per hour. After 150 cc. (144 parts) of the cyclohexanone-ethanol mixture has been added, the addition is discontinued. There is collected 118 parts of product in an ice trap. During the run 37.2 liters of gas is evolved. The product consists of a mixture of 109 parts of organic liquid and 9 parts of water. The water layer is removed and the organic layer is catalytically hydrogenated at 150° C. and 200 atm. hydrogen pressure, using 10 parts of nickel-on-kieselguhr as a catalyst. After reduction, the product, which amounts to 90 parts, is fractionated. The distillate consists of 42 parts of recovered cyclohexanol, 24 parts of a mixture of cis- and trans-2-ethylcyclohexanols, and 22 parts of higher boiling material. The 2-ethylcyclohexanol, b.p. 105° to 108° C. at 30 mm. pressure, is identified by preparation of a phenylurethane, M. P. 82° to 83° C. The reported melting point for the corresponding derivative of trans-2-ethylcyclohexanol is 82° to 83° C. Thus, a 27% conversion of the cyclohexanone to alkylated products has been effected. A duplication of the above experiment at 250° C. gives analogous results.

*Example 7.*—A pressure vessel, lined with stainless steel, is charged with 100 parts of cyclohexanone, 100 parts ethanol, and 5 parts alloy skeleton nickel catalyst. The vessel is closed, agitated, and heated at 250° C. for eight hours. The vessel is cooled, opened, and the product, 160 parts, is filtered and washed three times with 25 parts of water. The water-insoluble fraction, 83.4 parts, is fractionated to recover the 2-ethylcyclohexanone formed.

*Example 8.*—A stainless steel-lined pressure reactor is charged with 100 parts of cyclohexanone, 50 parts ethanol, and 10 parts of a catalyst consisting of 2 parts zinc oxide and 1 part copper oxide. The vessel is closed, agitation is started, the reactor heated to 250° C. and maintained at this temperature for eight hours. The vessel is cooled, opened, and 114 parts of material recovered. The catalyst is removed by filtration and the filtrate (94.8 parts) washed three times with 25 parts of water. The water-insoluble residue, 84.3 parts, is fractionated to recover the 2-ethylcyclohexanone formed.

The process of this invention provides a simple, direct route to substituted cyclic ketones which are useful intermediates for substituted dibasic acids, which in turn are of interest for the preparation of polyamides, polyesters, polyesteramides, etc. Since many apparently widely different embodiments of this invention may be made without departing from the spirit and scope thereof, it is to be understood that the invention is not limited in any way except as set forth in the following claims.

I claim:

1. A process for preparing 2-ethylcyclohexanone which comprises reacting cyclohexanone with ethanol at a temperature of 200° C. to 350° C. in the presence of a reduced, finely divided cobalt hydrogenation catalyst.

2. A process for preparing substituted alicylic ketones by reaction between a primary alcohol containing no reactive groups other than hydroxyl, and an alicyclic ketone containing a

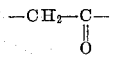

group as a part of the cyclic structure and which is wholly hydrocarbon aside from the oxo-oxygen, which process comprises contacting the said alcohol and the said ketone with a hydrogenation catalyst at a temperature within the range of 200° to 350° C.

3. A process for preparing substituted alicyclic ketones by reaction between a monohydroxy primary alcohol containing no reactive groups other than hydroxyl, and an alicyclic ketone containing a

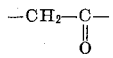

group as a part of the cyclic structure and which is wholly hydrocarbon aside from the oxo-oxygen, which process comprises contacting the said alcohol and the said ketone with a hydrogenation catalyst at a temperature within the range of 200° to 350° C.

4. A process for preparing substituted alicylic ketones by reaction between ethanol and an alicyclic ketone containing a

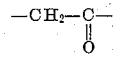

group as a part of the cyclic structure and which is wholly hydrocarbon aside from the oxo-oxygen, which process comprises contacting ethanol and the said ketone with a hydrogenation catalyst at a temperature within the range of 200° to 350° C.

5. A process for preparing substituted cyclohexanones by reaction between a primary alcohol containing no reactive groups other than hydroxyl, and cyclohexanone, which process comprises contacting the said alcohol and the cyclohexanone with a hydrogenation catalyst at a temperature within the range of 200° to 350° C.

6. A process for preparing substituted alicyclic ketones by reaction between a primary alcohol containing no reactive groups other than hydroxyl, and an alicyclic ketone containing a

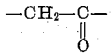

group as a part of the cyclic structure and which is wholly hydrocarbon aside from the oxo-oxygen, which process comprises contacting the said alcohol and the said ketone with a reduced, finely divided cobalt hydrogenation catalyst at a temperature within the range of 200° to 350° C.

7. A process for preparing substituted alicyclic ketones by reaction between a primary alcohol containing no reactive groups other than hydroxyl, and an alicyclic ketone containing a

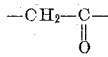

group as a part of the cyclic structure and which is wholly hydrocarbon aside from the oxo-oxygen, which process comprises contacting the said alcohol and the said ketone with a hydrogenation catalyst at a temperature within the range of 240° to 270° C.

WILLIAM PRICHARD.

REFERENCES CITED

The following references are of record in the file of this patent:

UNITED STATES PATENTS

| Number | Name | Date |
|---|---|---|
| 2,064,254 | Fuchs et al. | Dec. 15, 1936 |
| 2,387,617 | Schmidt et al. | Oct. 23, 1945 |

OTHER REFERENCES

Ipatieff et al.: J. Org. Chem., vol. 7, pages 189–198 (1942).

Skita: Berichte, vol. 48, pages 1486–1498 (1915).